Patented Feb. 22, 1949

2,462,737

UNITED STATES PATENT OFFICE 2,462,737

POLYMERIC COMPOUNDS FROM
1,3-DIOXOLANE

William F. Gresham, Wilmington, Del., assignor to E. I. du Pont de Nemours & Company, Wilmington, Del., a corporation of Delaware No Drawing. Application February 21, 1945,
Serial No. 579,146

10 Claims. (Cl. 260—338)

This invention relates to a process for the preparation of organic compounds and more particularly to their preparation from 1,3-dioxolane and aromatic hydrocarbons. It likewise relates to the resulting polymers. This application is in part a continuation of application S. N. 424,296, filed December 24, 1941, now abandoned.

An object of the present invention is to provide new reaction products obtainable from the reaction of 1,3-dioxolane with other organic compounds. Another object of the invention is to provide new compositions of matter from 1,3-dioxolane or its substitution products and aromatic hydrocarbons or hyrocarbon substitution hydrocarbons. Another object is to provide reaction conditions and catalysts for such reactions, whereby valuable products are obtainable. Other objects and advantages of the invention will hereinafter appear.

Valuable products are obtained in accord with the invention by reacting 1,3-dioxolane, substituted 1,3-dioxolane, or reactants which form these compounds with the aromatic hydrocarbons, such as:

Benzene,
Toluene,
Xylene,
Ethyl benzene,
Phenylethane,
Mesitylene,
Methyl ethyl benzene,
Propyl benzene,
Cumene,
Durene,
Pentamethyl benzene, and
Hexamethyl benzene, long chain alkyl benzenes, such as:

Amyl benzene,
Octyl benzene,
Dodecyl benzene, and especially those containing an alkyl group having more than 4 carbon atoms in the side chain.

The products of the invention are of relatively high molecular weight and will hereinafter be referred to as polymers, which term will include all products containing 1,3-dioxolane (or substituted 1,3-dioxolane) residues and aromatic hydrocarbon residues, there being present at least three residues, two of which are similar. For example, the polmers resulting from the reaction of 1,3-dioxolane with benzene will contain at least two 1,3-dioxolane residues

and at least one phenyl residue, $C_6H_5$— or vice versa.

The aromatic hydrocarbons may be reacted in accord with the procedural details more fully particularized hereinafter, with 1,3-dioxolane and its substitution products. 1,3-dioxolane has the chemical formula with numbering as shown:

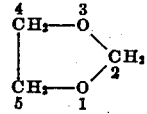

and may be obtained by reacting formaldehyde or a formal with ethylene glycol. Products with substituents in the 2 position can be readily obtained by reaction of ketones or other aldehydes either aliphatic or aromatic with ethylene glycol. Thus, by way of example, many compounds are obtained which may be employed in accord with the invention, such as 2-methyl-1,3-dioxolane,
2-ethyl-1,3-dioxolane,
2,2-dimethyl-1,3-dioxolane,
2,2-diethyl-1,3-dioxolane,
2-phenyl-1,3-dioxolane,
2,2-methylphenyl-1,3-dioxolane, and higher dioxolanes substituted in like manner which may, for example, be obtained from ethylene glycol and acetaldehyde, propanol, acetone, diethyl ketone, benzaldehyde, methyl phenyl ketone, and higher substituted aldehydes respectively. The invention likewise contemplates the use of dioxolanes substituted in the 4 and/or 5 positions. These dioxolanes are obtained by the interaction of substituted 1,2-glycols with aldehydes, for example, 1,2-propylene glycol plus formaldehyde will give 4-methyl-1,3-dioxolane and similarly the following dioxolanes can be readily prepared from formaldehyde and the corresponding glycols:

4-ethyl-1,3-dioxolane,
4-propyl-1,3-dioxolane,
4,5-dimethyl-1,3-dioxolane.

In lieu of 1,3-dioxolane, reactants may be used which form 1,3-dioxolane and in such reactions there would be present the aromatic compound to be reacted together with, for example, formaldehyde and ethylene glycol, methylal and ethylene glycol, or other reactants which will form 1,3-dioxolane.

Valuble polymers are obtainable by the reaction of small amounts of 1,3-dioxolane or its derivatives with large amounts of the aromatic compound, that is, in the order of 1–100 and the reverse is also true. The greater the amount of 1,3-dioxolane present, the greater becomes the viscosity of the polymers until solids are eventually produced, while contrariwise, the greater the ratio of the aromatic compound the less viscous will be the resulting polymer. There appears to be no limiting factor restricting the proportion of reactants.

The reaction between 1,3-dioxolane and the aromatic compound is effected at temperatures ranging between −80 and 300° and preferably between 0 and 150° C. Atmospheric sub- or super-atmospheric pressures may be used and, if the last, pressure may range between 1 and 1000 atmospheres or higher. Normally excellent results are obtained at or about atmospheric pressure. If desired, the temperature of the reaction, especially when polymerization is carried out at the boiling point of the reaction mixture, may be controlled by varying the pressure on the boiling reactants.

It has been found advantageous to effect the reaction in the presence of an acid catalyst, such, for example, as sulfuric acid, phosphoric acid; the halogen acids, such as hydrochloric acid, hydrofluoric acid (alone or with $BF_3$); boron fluoride (including its complexes with water, acids, esters, alcohols, and the like), paratoluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their salts such as sodium acid sulfate, sodium acid phosphate, and so forth.

The catalyst may be supported or not on inert supports such as charcoal, silica gel (which alone is a catalyst for the reaction), kieselguhr, and so forth. Concentrations of $BF_3$, $H_2SO_4$ and similarly strong catalysts may be extremely low; less than 0.1%, and amounts down to as low as 0.001% of the strong acid catalyst have been found sufficient to give polymers although high concentrations of the catalyst even equal to or greater than the weight of the dioxolane are likewise satisfactory.

The reaction is preferably continued approximately to equilibrium in order to obtain the above defined polymeric organic compounds. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressures. As soon as the catalyst has been neutralized, the reaction ceases. The neutralized catalyst may be filtered off and the polymerized product which remains treated for the recovery of the polymers.

In the reaction of the dioxolanes with the aromatic compounds and more especially when the higher molecular weight products are being prepared there usually will be found in the reaction mixture along with the polymer unreacted dioxolane and the aromatic compound together with by-products and polymers which it is not desired to produce. It is possible to inhibit the formation of the undesired products by carrying out the process in an intermittent or continuous manner whereby the desired polymer is withdrawn from the reaction zone and the undesirable products, after being separated therefrom, are returned to the reaction zone. By this means it is possible to obtain high yields of the desired polymer.

In addition to being instrumental in stopping the reaction at the desired point, the neutralization of the catalyst tends to stabilize the polymers. It follows, therefore, that for high temperature uses no acid should be present in the polymers. They should preferably be neutral or on the alkaline side.

Examples will now be given illustrating embodiments of the invention but it will be understood that it will not be limited by the details thereof. Parts are by weight unless otherwise indicated.

*Example 1.*—A reaction mixture containing 736 parts of toluene, 148 parts of 1,3-dioxolane, and 8 parts of boron fluoride was heated on a steam bath under a returned condenser supplied with a calcium chloride drying tube for 5 hours. In the initial stage of processing boiling occurred. As reaction progressed a colorless viscous liquid was produced. The cooled reaction product was treated with a stream of anhydrous ammonia (until blue to litmus) followed by 3.1 parts of sodium hydroxide dissolved in 10 parts of water. Unconverted 1,3-dioxolane and water were removed under reduced pressure, the last traces at 100° C. and 1 mm. pressure. The product, 51 parts, was a practically colorless viscous liquid boiling higher than 74° C. at 1 mm., and was only partially soluble in water.

*Example 2.*—Under conditions described in Example 1, 20.4 parts of a long-chain alkyl benzene (prepared from benzene and a mixture of olefines which boiled at 120–140° C., which in turn was prepared by dehydrating a mixture of alcohols boiling between 170 and 190° C., obtained by the catalytic hydrogenation of carbon oxides under elevated temperatures and pressures, by passing the mixture of alcohols over an aluminum phosphate catalyst at a temperature of approximately 400° C.), 222 parts of 1,3-dioxolane and 2.4 parts of boron fluoride gave 163.5 parts of a light brown viscous liquid having the following physical and chemical constants: hydroxyl No. 69, molecular weight 1820.

The modified aromatic organic compounds of the invention are adaptable for use as organic intermediates and for use as solvents and plasticizers for films and filaments of cellulose derivatives and polyamides generally.

The polymers hereinbefore described may be used as plasticizers for rubber, artificial rubber, and resins generally; as sizes, softeners, mercerizing assistants, crushproofing assistants and assistants in textile uses; the high molecular weight polymers may find utility as films for use as greaseproof liners for food containers, bulletproof gasoline tanks and so forth; as polishes and waxes, and especially as substitutes for the mineral and vegetable waxes such as paraffin, ceresin, carnauba, japan, montan waxes and so forth; as print compositions, duplicator pad ingredients, paper sizes, paper adhesives, grease-proofing agents, and protective coatings generally; as electrical insulators; as dispersing agents for rubber and latex; as ingredients in copolymers with rubber, artificial rubber, resins, and plastics, as protective coatings for rubber and, ingredients in self-sealing tires and tubes; as leather preservatives, softeners, plasticizers, and agents to make leather fat resistant; as dispersing agents and binders for cosmetic creams, lotions, lipstick and so forth; as sealing agents for oil and gas wells; as drilling mud ingredients to control thixotropy; as settling, viscosity, and flotation agents in ore treating; as binding agents for finely divided materials, such as ceramic pigments and so forth; as agents to prevent curling in cellulose films; as binders for abrasive wheels; as cutting aids in metal turning; and as plasticizers for glue, casein, proteins, gelatin, cork, cellulose and cellulose derivatives.

I claim:

1. A process of making liquid polymers containing benzene and 1,3-dioxolane residues, there being present at least three such residues in the polymer which comprises mixing 1,3-dioxolane with benzene and effecting the polymerization in the presence of a boron trifluoride catalyst at a temperature between 50 and 150° C.

2. A process of making liquid polymers containing an alkyl benzene and 1,3-dioxolane residues, there being present at least three residues in the polymer which comprises mixing 1,3-dioxolane with an alkyl benzene and effecting the polymerization in the presence of a boron trifluoride catalyst at a temperature between 50 and 150° C.

3. A process of making liquid polymers of 1,3-dioxolane and long chain alkyl benzenes obtained from benzene and a mixture of olefines boiling between 120 and 140° C., obtained by dehydrating a mixture of alcohols, resulting from the catalytic hydrogenation of carbon oxides under elevated temperatures and pressures, which boil between 170 and 190° C., which comprises subjecting a molar excess of 1,3-dioxolane with such long chain alkyl benzenes to polymerization in the presence of a boron trifluoride catalyst and at a temperature between 50 and 150° C.

4. A process of making liquid polymers of 1,3-dioxolane and toluene which comprises heating a reaction mixture containing about 736 parts of toluene, 148 parts of 1,3-dioxolane and 8 parts of boron trifluoride on a steam bath under a reflux condenser for about 5 hours, treating the cooled reaction mixture with anhydrous ammonia until blue to litmus, adding about 3.1 parts of sodium hydroxide dissolved in 10 parts of water and, thereafter, removing the unconverted 1,3-dioxolane by distillation.

5. In a process of making liquid polymeric products from 1,3-dioxolane, the step which comprises mixing 1,3-dioxolane with an aromatic compound of the group consisting of benzene and alkyl benzenes and effecting the polymerization by heating to a temperature between 50 and 150° C. in the presence of a boron trifluoride catalyst, thereafter neutralizing the catalyst and recovering the polymeric product.

6. The process of claim 4 in which the aromatic compound is toluene.

7. In a process of making liquid polymeric products from 1,3-dioxolane, the step which comprises mixing a molecular excess of 1,3-dioxolane with a compound of the group consisting of benzene and alkyl benzenes and causing a polymer to be formed between these reactants by contacting the mixture with a boron trifluoride catalyst at a temperature between 50 and 150° C., thereafter neutralizing the catalyst and recovering the polymer.

8. A liquid polymeric condensation product of 1,3-dioxolane and an aromatic compound of the group consisting of benzene and alkyl benzenes.

9. A liquid polymeric condensation product of 1,3-dioxolane and toluene.

10. A liquid polymeric condensation product of 1,3-dioxolane and long-chain alkyl benzenes.

WILLIAM F. GRESHAM.

REFERENCES CITED

The following references are of record in the file of this patent:

UNITED STATES PATENTS

| Number | Name | Date |
|---|---|---|
| 2,098,108 | Reppe | Nov. 2, 1937 |
| 2,187,081 | Hodgins | Jan. 16, 1940 |
| 2,366,737 | Loder | Jan. 9, 1945 |
| 2,394,862 | Loder et al. | Feb. 12, 1946 |